United States Patent

Thauer

[15] 3,693,935
[45] Sept. 26, 1972

[54] THROTTLE VALVE MOUNTING FOR EXHAUST GAS LINE

[72] Inventor: Peter Thauer, Neuhaus, Germany

[73] Assignee: Volkswagenwerk Aktiengesellschaft, Wolfsburg, Germany

[22] Filed: Jan. 13, 1971

[21] Appl. No.: 97,415

[30] Foreign Application Priority Data

Feb. 4, 1970 Germany..........P 20 04 990.5

[52] U.S. Cl..............................................251/305
[51] Int. Cl..................................................F16k 1/22
[58] Field of Search.......251/298, 304, 305, 308, 313

[56] References Cited

UNITED STATES PATENTS

| | | |
|---|---|---|
| 2,768,648 | 10/1956 | Woolley................251/308 X |
| 2,817,489 | 12/1957 | Hesmer................251/305 X |
| 3,078,070 | 2/1963 | Cooper....................251/306 |

FOREIGN PATENTS OR APPLICATIONS

| | | |
|---|---|---|
| 249,019 | 3/1926 | Great Britain............251/305 |
| 623,696 | 5/1949 | Great Britain............251/306 |

*Primary Examiner*—Henry T. Klinksiek
*Attorney*—Watson, Cole, Grindle & Watson

[57] ABSTRACT

An exhaust pipe for an internal combustion engine is formed through its side-wall with an internally threaded opening for reception of an externally threaded bearing having a bore therethrough in which the throttle valve shaft is rotatably mounted with clearance, with the throttle valve carried at its inner end within the exhaust pipe and with an operating lever at its outer end. The shaft is formed with a radially projecting collar having an outwardly converging conical surface and the shaft is spring loaded to urge such surface into flush sealing engagement with a conformingly shaped conical bearing face of the bearing, which functions both to seal the bore and to center the valve shaft therein.

8 Claims, 1 Drawing Figure

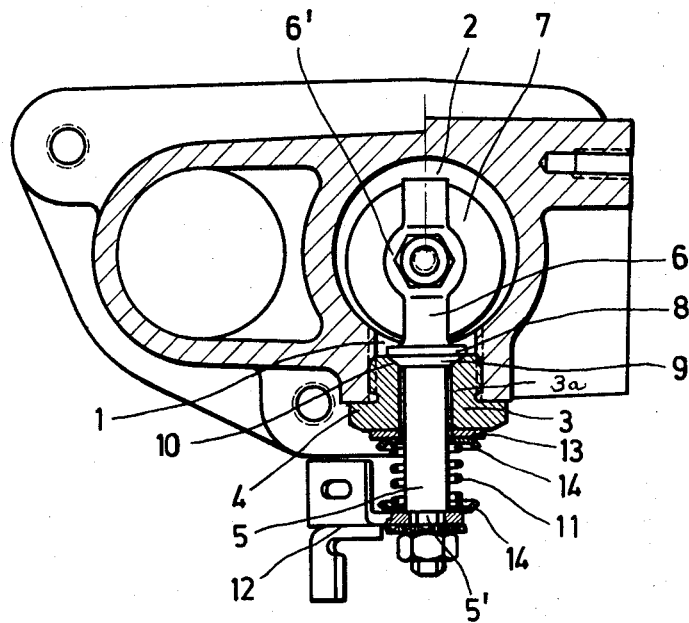

THROTTLE VALVE MOUNTING FOR EXHAUST GAS LINE

This invention relates to the mounting of a throttle valve shaft in the exhaust gas pipe of an internal combustion engine.

Difficulties have been encountered in rotatably mounting the throttle valve shaft in an opening through the exhaust pipe side wall. The corrosive and contaminating action of the exhaust gases have required on the one hand that the throttle valve shaft have considerable considerable with the bore or opening in the bearing through which it extends, in order to prevent jamming or binding. However, where sufficient clearance is provided to achieve this end, the clearance space thus provided, may permit excessive leakage of exhaust gasses through the bearing.

Although it has heretofore been attempted to overcome this difficulty by the judicious selection of materials for forming the bearing and shaft, it has been found, nevertheless, that this solution to the problem is but a temporary one, and the shaft tends eventually to bind in the bearing in any event.

The present invention involves a simple solution to this problem. In accordance with the present invention, the throttle valve extends with substantial clearance through the bore in a tube-like bearing or bearing member, and is formed with a radially projecting collar on the internal side of the bearing which is urged against and in sealing relation with a cooperating surface portion of the bearing by a spring on the outer end of the shaft. Preferably, the co-acting bearing surfaces of the collar and the bearing are of similar conical configuration to achieve a centering effect for maintaining the shaft in concentric relation within the bearing bore and thus out of possible binding engagement therewith on all sides, such conical configuration also achieving an improved sealing effect. The spring preferably is shielded in suitable manner against heat from the exhaust pipe.

A further important feature of the invention is the relative proportioning of the opening in the side wall of the exhaust pipe, the external diameter of the bearing, and the throttle valve to permit complete assembly of the throttle valve and its shaft together with the bearing for preassembly as a unit which may later be assembled to the exhaust pipe. For governing the diametrical or transverse position of the throttle valve within the exhaust pipe passage, the bearing may be formed at its outer axial end with the radially projecting flange to serve as a stop for limiting the movement of the bearing into its receptive bore and also for engagement with a cooperating surface around the outer end of the bore to provide a sealing function.

Because of the spring loading of the shaft and the centering action of the cooperating conical surfaces, the binding or jamming of the throttle valve shaft will be avoided, while nevertheless, such surfaces achieve a reliable sealing effect to prevent escape of the exhaust gasses through the clearance space around the shaft.

The preferred embodiment of the invention has been illustrated in the accompanying drawing, in which the FIGURE is a cross-sectional view of an internal engine exhaust pipe and adjacent parts having the improved throttle valve and mounting of the invention applied thereto.

Referring now in detail to the accompanying drawing, an internally threaded radial bore 1 is formed through the sidewall of the exhaust pipe 2 so as to communicate with the interior thereof, and an externally threaded, preferably cylindrical bearing 3 is operatively disposed in said bore and is accurately radially positioned by means of a radially projecting flange 4 at its outer end, the inwardly directed face or shoulder of which abuts against the preferably flat surface of the exhaust pipe structure surrounding the outer end of the bore 1 and preferably is in sealing relation therewith. Rotatably disposed through the central bore 3a extending coaxially through the bearing 3, is the throttle valve shaft 5 which is of appreciably less diameter than the bore 3a so as to have appreciable clearance with such bore in order to avoid any possible binding or jamming due to corrosion, dirt or thermal expansion. The internal end 6 of this shaft within the exhaust pipe 2 is suitably formed as at 6' to serve as a mounting for the disc-like throttle valve 7 which, being affixed to the shaft 5, is angularly adjustable therewith within the exhaust pipe.

Formed on the shaft 5 is a radially outwardly projecting collar 8, having an outwardly facing conical surface 9 converging toward the bearing body 3 for sealing engagement with a conformingly conically concave surface 10 in the bearing body 3.

The conical surfaces 9 and 10 are resiliently maintained in flush sealing engagement with each other by a spring 11 encircling the outer end portion of the shaft 5 and compressed between the bearing body 3 and an operating or control lever 12 affixed to the free outer end of the shaft 5 to extend radially therefrom for actuation in any suitable manner to control the angular position of the shaft and its throttle valve. An insulating disc 13, preferably, is interposed between the spring and the bearing body 3 on the shaft 5 to shield the spring from the effect of heat from the exhaust pipe 2. Preferably, the spring transmits its thrust through washers 14 on the shaft 5.

In the operation of the throttle valve, it will be readily apparent that theinterengaged conical surfaces, by virtue of their tight wedging flush engagement under the pressure of the spring 11, maintain a complete and adequate seal to prevent escape of gasses from the interior of the exhaust pipe 2 through the clearance space between the internal walls of the board 3a and the shaft 5.

Furthermore, because of the concentric relationship of the bearing surfaces 9 and 10 to the shaft 5 and the bore 3a, respectively, these conical surfaces when interengaged by the thrust of the spring 11 will automatically center the shaft 5 to maintain it concentrically within the bore 3a to provide adequate clearance for a full 360° between the shaft and the bore whereby to prevent binding engagement of the shaft 5 with the bearing 3 within the bore.

The word "conical," as herein employed is intended in its broader sense to describe any generally tapering surface of revolution, whether straight or curved in the plane of its axis.

It will be apparent from the foregoing that the shaft 5, the throttle valve 7, bearing 3, spring 11 and lever 12 may all be preassembled as a unit prior to application to the exhaust pipe 2, the internally threaded opening 1 in such event being proportioned to permit insertion therethrough of the throttle valve 7, whereby the preassembled unit may be readily applied to the exhaust pipe simply by threading the bearing 3 into the bore or opening 1 of the exhaust pipe.

In this application, I have shown and described only the preferred embodiment of my invention simply by way of illustration of the practice of my invention and without intending any limitation of the scope thereof. Accordingly, it will be realized that the illustrated construction might be subject to various changes and modifications without departing from the scope of the invention as defined by the appended claims.

Having thus described my invention, I claim:

1. A mounting of a throttle shaft in an exhaust pipe of an internal combustion engine, characterized by a bearing disposed in an opening in the side of the exhaust pipe, a throttle valve shaft rotatably disposed through said bearing, a collar on said shaft having a generally conical centering surface, and spring means urging said surface against a correspondingly developed counter surface on the bearing.

2. A mounting according to claim 1, wherein is included insulating means interposed between the bearing and the spring whereby the latter is shielded from the effect of heat.

3. A mounting according to claim 1, characterized in that the bearing consists of a hollow screw which has a limiting stop.

4. In combination with the exhaust pipe of an internal combustion engine, said exhaust pipe having an internally threaded circular opening through the sidewall thereof with its axis perpendicularly intersecting the axis of the exhaust pipe, a cylindrical bearing threaded into said opening, said bearing having a bore therethrough concentric to its cylindrical axis, a throttle valve shaft rotatably disposed through said bore, a throttle valve supported by said shaft within the exhaust pipe for rotary adjustment with the shaft, said shaft being proportioned relative to said bore to provide substantial clearance therewith, a radially outwardly projecting collar on said shaft adjacent the inner end of said bearing, said collar and said bearing having mating conical surfaces coaxial to said shaft, and resilient means exerting an axial thrust on said shaft to urge said mating conical surfaces axially into operative engagement with each other, whereby to provide a seal between the interior of said exhaust pipe and said bore through the bearing, and to center said shaft coaxially within the bore and out of engagement with the interior surface of the bearing within said bore.

5. The invention defined in claim 4, including means affixed to the external end of said shaft in spaced relation from said bearing, said resilient means comprising a coil spring encircling said shaft and compressed between said last mentioned means and the bearing.

6. The invention defined in claim 5 wherein said last mentioned means comprises a control lever affixed to and projecting radially from said shaft.

7. A throttle valve assembly for application to an exhaust pipe of an internal combustion engine, comprising a cylindrical bearing externally threaded for operative reception within an internally threaded opening through the side wall of the exhaust pipe, said bearing being formed with a coaxially disposed bore therethrough, a throttle valve shaft rotatably disposed through said bore and proportioned to provide substantial clearance with said bore, said shaft having an inner end portion adapted to support a throttle valve within the exhaust pipe and an outer end portion adapted to transmit rotary control movement to said throttle valve, a radially outwardly projecting enlarged collar formed on the inner end portion of said shaft, said collar and said bearing having mating conical surfaces in sealing engagement with each other around the inner end of said bore, and resilient means associated with said shaft for exerting a longitudinal thrust thereon to maintain said sealing engagement between the conical surfaces, said conical surfaces coacting to center said shaft coaxially within said bore and in spaced relation from the internal surface of said bore.

8. The invention defined in claim 7, including means defining an abutment on the outer end portion of said shaft spaced axially from the bearing, said resilient means comprising a spring encircling said shaft and compressed between said abutment and the bearing.

* * * * *